United States Patent
Deodhar et al.

(10) Patent No.: US 10,810,030 B2
(45) Date of Patent: *Oct. 20, 2020

(54) IDENTIFYING ENTITIES IN A VIRTUALIZATION ENVIRONMENT BY CONVERTING HETEROGENEOUS STRING IDENTIFIERS FOR INTERACTION WITH A SINGLE API

(71) Applicant: Nutanix, Inc., San Jose, CA (US)

(72) Inventors: Akshay Deodhar, Cupertino, CA (US); Binny Sher Gill, San Jose, CA (US); Venkata Vamsi Krishna Kothuri, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,865

(22) Filed: Dec. 13, 2016

(65) Prior Publication Data

US 2018/0157513 A1 Jun. 7, 2018

Related U.S. Application Data

(60) Provisional application No. 62/430,798, filed on Dec. 6, 2016.

(51) Int. Cl.
*G06F 9/455* (2018.01)
*G06F 9/50* (2006.01)
(Continued)

(52) U.S. Cl.
CPC .......... *G06F 9/45533* (2013.01); *G06F 9/451* (2018.02); *G06F 9/45558* (2013.01);
(Continued)

(58) Field of Classification Search
CPC .. G06F 9/45533; G06F 9/45558; G06F 9/451; G06F 9/5027; G06F 17/30604;
(Continued)

(56) References Cited

U.S. PATENT DOCUMENTS 7,961,722 B1 6/2011 Jankowski
8,505,006 B1 8/2013 Larkin et al.
(Continued)

OTHER PUBLICATIONS

Non-Final Office Action on U.S. Appl. No. 15/828,772 dated Oct. 9, 2018.
(Continued)

*Primary Examiner* — Meng Ai T An
*Assistant Examiner* — Michael W Ayers
(74) *Attorney, Agent, or Firm* — Foley & Lardner LLP (57) ABSTRACT

In one embodiment, a system includes host machines that form elements of the virtualization environment, and that include a hypervisor, a user virtual machine (UVM), a connection agent, and an I/O controller. The system further includes a virtual disk comprising a plurality of storage devices, the virtual disk being accessible by all of the I/O controllers. At least one of host machines receives a request associated with one of the elements using an application programming interface (API), and including a context-specific identifier. The host machine determines, using reflection, a type of the context-specific identifier and processes the request based on a mapping, according to the determined type, from the context-specific identifier to a unique identifier associated with the element.

24 Claims, 5 Drawing Sheets

(51) Int. Cl.
  *G06F 9/28* (2006.01)
  *G06F 16/28* (2019.01)
  *H04L 29/06* (2006.01)
  *H04L 29/12* (2006.01)
  *G06F 9/451* (2018.01)

(52) U.S. Cl.
  CPC .......... *G06F 9/5027* (2013.01); *G06F 16/288* (2019.01); *H04L 63/0876* (2013.01); *G06F 2009/45583* (2013.01); *H04L 61/6022* (2013.01)

(58) Field of Classification Search
  CPC ....... G06F 2009/45583; H04L 63/0876; H04L 61/6022
  See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2005/0125625 A1* | 6/2005 | Kilian | G06F 3/0611 711/202 |
| 2008/0127326 A1* | 5/2008 | Dugan | G06F 9/5077 726/15 |
| 2010/0223613 A1* | 9/2010 | Schneider | G06F 9/45558 718/1 |
| 2010/0313210 A1* | 12/2010 | Lin | H04L 61/1576 719/328 |
| 2012/0054744 A1 | 3/2012 | Singh et al. | |
| 2012/0096461 A1* | 4/2012 | Goswami | G06F 9/45558 718/1 |
| 2012/0331461 A1* | 12/2012 | Fries | H04L 67/2861 718/1 |
| 2013/0125124 A1* | 5/2013 | Kempf | G06F 9/45533 718/1 |
| 2013/0191826 A1* | 7/2013 | Heninger | G06F 9/45533 718/1 |
| 2013/0308641 A1* | 11/2013 | Ackley | H04L 45/7457 370/392 |
| 2015/0106805 A1* | 4/2015 | Melander | G06F 9/45537 718/1 |
| 2015/0169206 A1* | 6/2015 | Balakrishnan | G06F 3/04847 715/740 |
| 2015/0215308 A1* | 7/2015 | Manolov | H04L 63/0823 709/229 |
| 2015/0277861 A1* | 10/2015 | Jennings | G06F 8/41 717/148 |

OTHER PUBLICATIONS

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

IDENTIFYING ENTITIES IN A VIRTUALIZATION ENVIRONMENT BY CONVERTING HETEROGENEOUS STRING IDENTIFIERS FOR INTERACTION WITH A SINGLE API

PRIORITY

This application claims the benefit, under 35 U.S.C. § 119(e), of U.S. Provisional Patent Application No. 62/430,798, filed 6 Dec. 2016, which is incorporated herein by reference.

TECHNICAL FIELD

This disclosure generally relates to identification of entities in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

A plurality of host machines may implement a virtualization environment. The virtualization environment may also include a virtual disk comprised of multiple storage devices, the virtual disk being accessible by I/O controllers from various user virtual machines. A controller virtual machine in the virtualization environment may receive API requests associated with the monitoring and management of the various elements of the virtualization environment. The requests may include a context-specific identifier, which identifies an element associated with the request. The controller may determine, using reflection, a type of the context-specific identifier. Based on the determined type of the identifier, the controller maps the context-specific identifier to a unique identifier associated with the element. In this manner, the controller may use a single API to receive requests using heterogeneous identifiers.

The present invention provides an architecture for implementing polymorphic identification of entities in a virtualization environment.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

A virtualization environment can comprise many kinds of heterogeneous entities, including software and hardware entities. As an example and not by way of limitation, entities may include virtual machines, virtual disks, virtual networks, physical nodes, clusters, physical disks, physical storage devices, physical network interfaces, user accounts, events, alerts, logfiles, etc. All of these various types of entities may be managed and accessed by virtualization software (for example, a controller virtual machine), and therefore each may need to be uniquely identifiable within the virtualization environment. Additionally, entities may be identified using multiple heterogeneous attributes associated with different entity types. For example, a virtual machine may be identifiable by a name (e.g., "PaloAltoVM1"), a network interface may be identifiable by a MAC address (e.g., 1234:5678:90AB:CDEF), and a physical storage device may be identifiable by number (e.g., 4567). From a user perspective, it may be desirable for a user to be able to identify an entity using various entity identifiers to, for example, make application programming interface (API) calls that reference the entity.

One approach may be to provide various APIs that support different kinds of identifiers. For example, a management service for the virtualization environment may implement various APIs to provide the CPU utilization of a physical node. One example API may identify the desired CPU by a string name (e.g., getCPUStatus(String machineName)), a second example API may identify the CPU by an integer number (getCPUStatus(Integer machineNumber)), and a third example API may identify the CPU by a MAC address in long integer form (e.g., getCPUStatus(Long macAddress)). However, providing multiple APIs may increase the complexity of preparing and maintaining code, since programmers and users may need to keep track of the various APIs and identifiers supported. Particular embodiments provide an architecture for implementing polymorphic identification of entities in a virtualization environment, which allows the use of a single API to receive requests using heterogeneous identifiers.

Figure 1A:
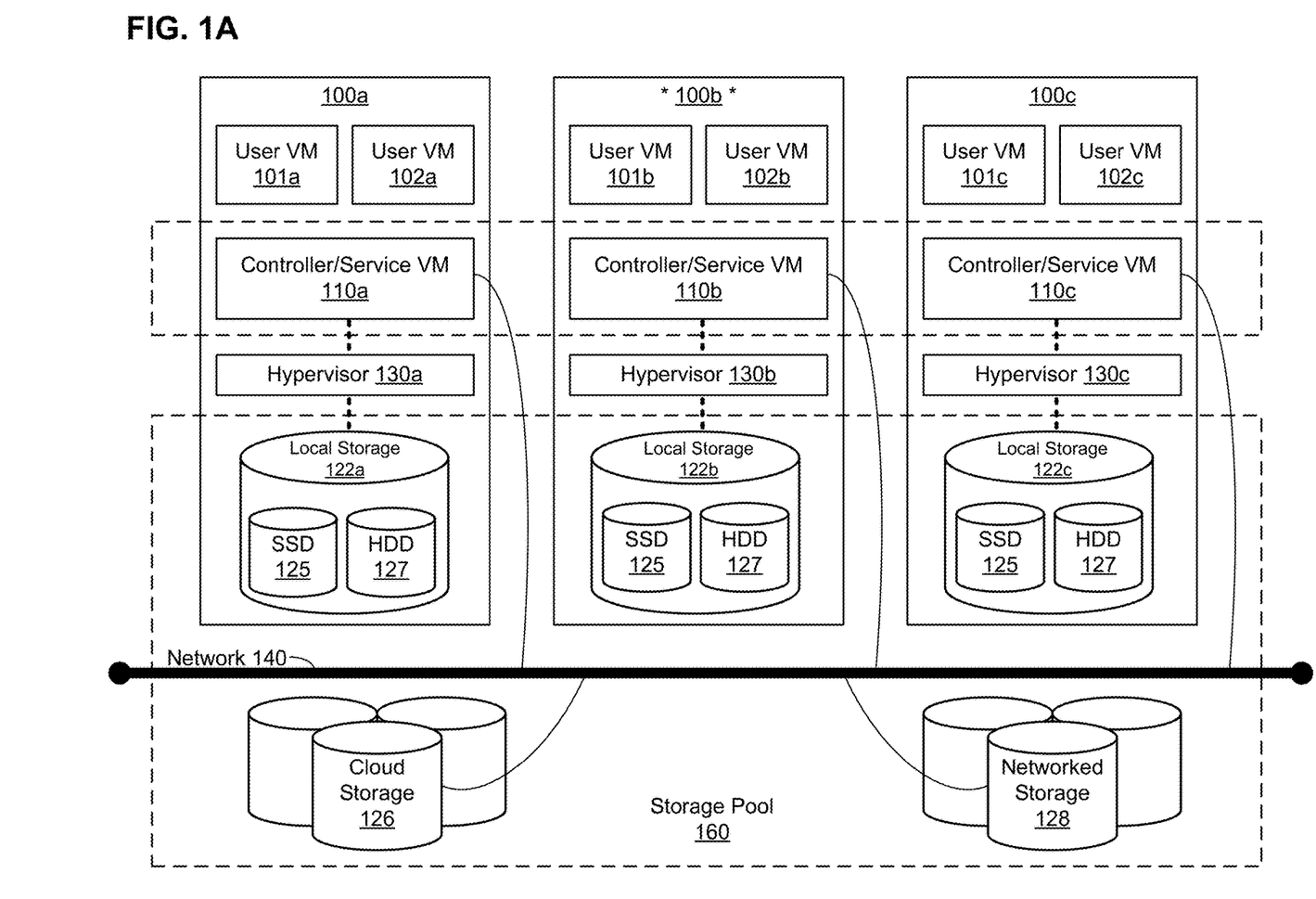
FIG. 1A illustrates a clustered virtualization environment according to particular embodiments.

FIG. 1A illustrates a clustered virtualization environment according to particular embodiments. The architecture of FIG. 1A can be implemented for a distributed platform that contains multiple host machines 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122a-c that is within or directly attached to the server and/or appliance to be managed as part of storage pool 160. Examples of such storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM (CVM) 110 to be used by a user VM. In some embodiments, the vDisk is exposed via iSCSI ("internet small computer system interface") or NFS ("network file system") and is mounted as a virtual disk on the user VM.

Each host machine 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140. In particular embodiments, a host machine 100 may be a physical hardware computing device; in particular embodiments, a host machine 100 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 100, and work together to form a distributed system 110 that manages all the storage resources, including local storage 122, networked storage 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 100b, as indicated by the asterisks, may be a leader node. A leader node may have a software component designated to perform operations of the leader. For example, CVM 110b on host machine 100b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 101a-c and 102a-c. These disks are virtual, since they are implemented by the software running inside CVMs 110a-c. Thus, to user VMs 101a-c and 102a-c, CVMs 110a-c appear to be exporting a clustered storage appliance that contains some disks. All user data (including the operating system) in the user VMs 101a-c and 102a-c reside on these virtual disks.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
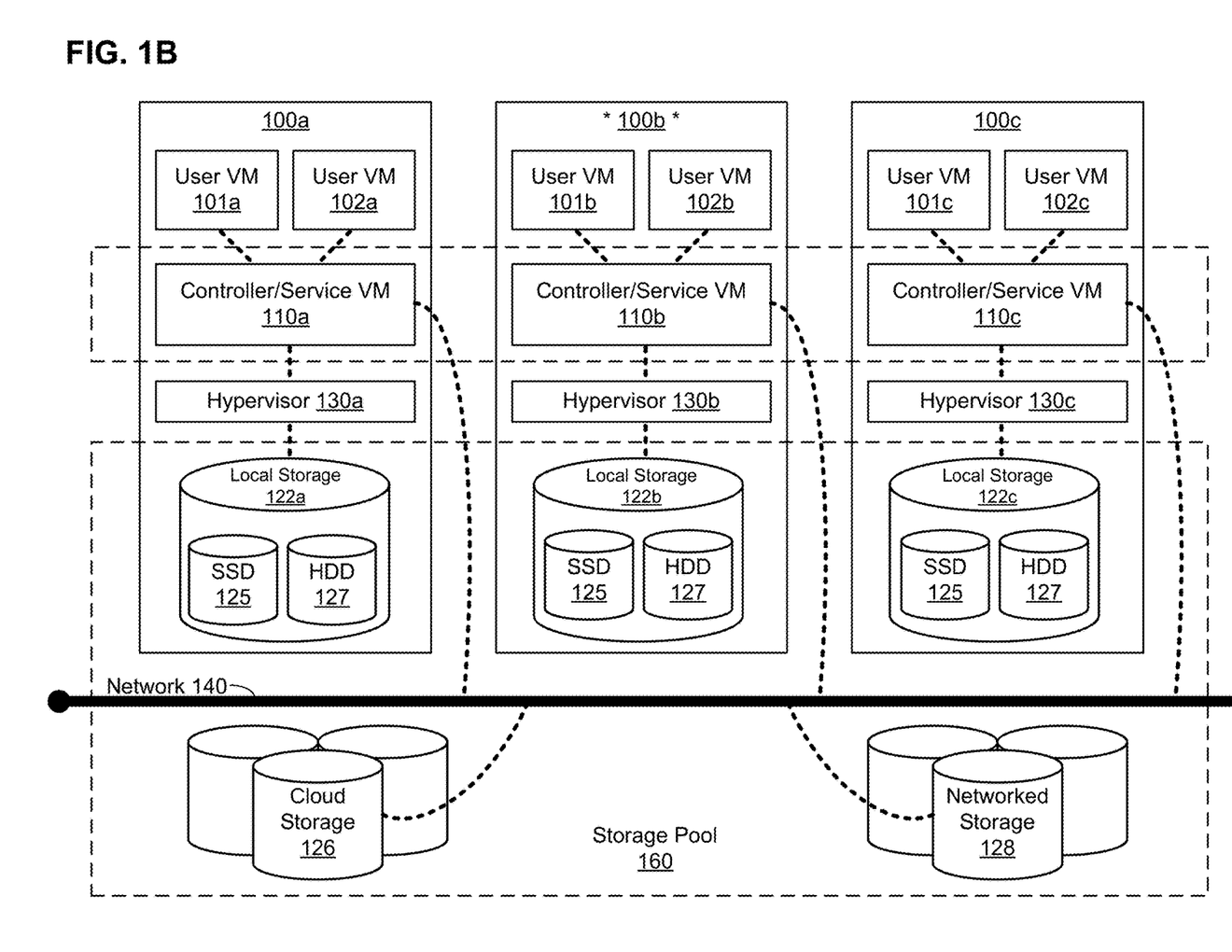
FIG. 1B illustrates data flow within a clustered virtualization environment according to particular embodiments.

FIG. 1B illustrates data flow within an example clustered virtualization environment according to particular embodiments. As described above, one or more user VMs and a CVM may run on each host machine 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 100a, by connecting via network 140 to cloud storage 126 or networked storage 128, or by connecting via network 140 to local storage 122b-c within another host machine 100b-c (e.g., via connecting to another CVM 110b or 110c). In particular embodiments, any suitable computing system 400 may be used to implement a host machine 100.

Figure 2:
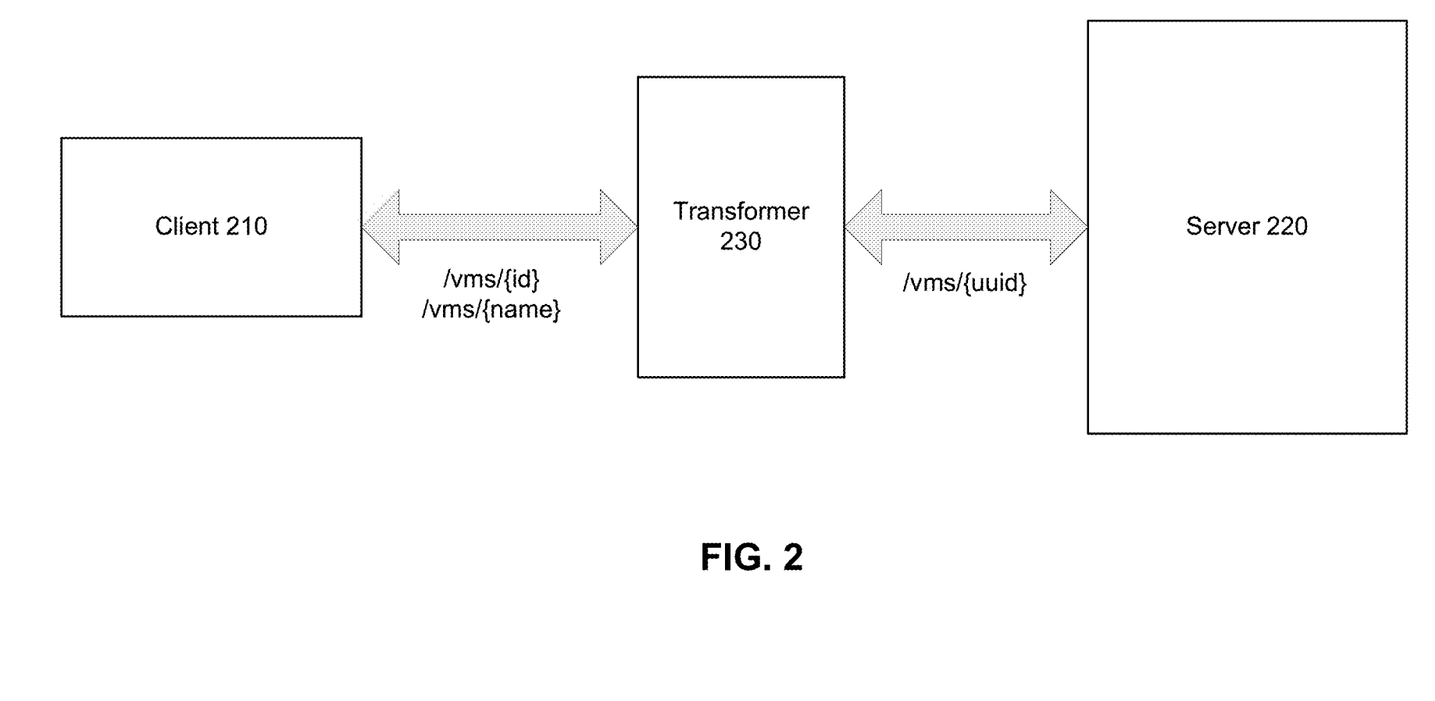
FIG. 2 illustrates a dataflow diagram for an API framework that supports multiple identifier types.

Particular embodiments provide systems and methods for an API that performs polymorphic identification of entities in a virtualization environment, so that the API can be called using multiple types of identifiers. FIG. 2 illustrates a dataflow diagram for an API framework that supports multiple identifier types, according to example embodiments. The framework includes a client 210 that sends an API request using an identifier type, an interceptor/transformer 230 that transforms the identifier type to a unique identifier, and a server 220 that fulfills the request. For example, client 210 may be a user that generates an API call through a user interface, such as a graphical user interface (GUI), a command line interface, a script, etc. In another example, client 210 may be a monitoring service, event detection service, or any other element of the virtualization environment that generates the API call to obtain or alter information about a particular entity. In an embodiment, server 230 is a Controller/Service 110a-c that retrieves information to satisfy the API request. Interceptor/transformer 230 may be part (e.g., a module) of server 230, or may be a separate element of the virtualization environment. While specific reference to Controller/Service 110a-c is made throughout this disclosure, the disclosure contemplates that any component, or combination of components, of the virtualization environment may provide the APIs of the described embodiments.

In an embodiment, the Controller/Service 110a-c may receive a first request associated with one of the elements using an API, the first request including a context-specific identifier. For example, the Controller/Service may receive a API request for the available memory of a node, and the node is identified by a string representing its name in the virtualization environment. In an embodiment, the context-specific identifier may represent a hierarchical listing of a plurality of entity-type nodes in an entity-relationship graph, wherein each of the entity-type nodes represents an element in the virtualization environment. This hierarchy may be represented as a string of characters describing a path that identifies the location and name of the node (e.g., "/WestCoast/California/PaloAlto/Node4."

In an embodiment, the Controller/Service 110a-c may determine, using reflection, a type of the context-specific identifier. For example, the Controller/Service may use type introspection to determine that the type of the identifier included in the API request is a string data type. In an embodiment, the Controller/Service may use type introspection to determine that the type of the identifier is a class that inherits from an identifier type class. For example, a type may be a GlobalPath data type—storing a path of the element—that inherits from a general GlobalIdentifier class.

In an embodiment, the Controller/Service 110a-c processes the first request based on a mapping, according to the determined type, from the context-specific identifier to a unique identifier associated with the element. For example, the Controller/Service may map the path string "/WestCoast/California/PaloAlto/Node4" to a universal unique identifier (UUID), such as a 128-bit number generated by the Controller/Service. In an embodiment, the unique identifier may be a UUID, a MAC Address, disk address, or other device identifier.

In an embodiment, the Controller/Service 110a-c performs code introspection to determine the type of the context-specific identifier and determines a function, based on the determined type, that converts the context-specific identifier to a unique identifier. For example, the Controller/Service may use code introspection to determine that the identifier included with the API request is of a GlobalPath data type and that the GlobalPath data type inherits from the GlobalIdentifier class. The GlobalPath data type may represent the identifier using a string to represent the path of the element, while the GlobalIdentifier class may use a UUID to represent the same element. Using object-oriented polymorphism, the Controller/Service may identify a function of the GlobalPath class that transforms the GlobalPath identifier to a GlobalIdentifier identifier. For example, all classes that inherit from GlobalIdentifier may be required to implement a function called convertToGlobalId( ) that converts the child class identifier to a global identifier.

In an embodiment, Controller/Service 110a-c performs the conversion using the function to map, based on the type, the context-specific identifier to the unique identifier associated with the element. For example, the Controller/Service may use the identified function to map the path identifier to a UUID. The function may use any known methods to map the context-specific identifier to a unique identifier. For example, the function may access a database that contains information about the entities indexed by unique identifier, and query the database for an entity that matches the context-specific identifier. In the example above, the Controller/Service may query an entity database to return the UUID of any nodes with a global path "/WestCoast/California/PaloAlto/Node4." In another example, the function may perform a mathematical formula to generate a UUID from the context-specific identifier.

Once the Controller/Service has a unique identifier for the element, the Controller/Service can fulfill the API request associated with the element. In an embodiment, the Controller/Service 110a-c may transmit a second request, the second request comprising the unique identifier associated with the element and receive a response to the second request, the response comprising the unique identifier. For example, if the API request was to obtain the available memory for a node, the Controller/Service may use the UUID of the node to query a database to locate the network address of the node, and then send a request to the node to obtain its current memory usage. In another example, the Controller/Service may access a resources database that has resource availability information for various entities in the virtualization environment, and may query the resources database for the available memory of the node.

In an embodiment, the Controller/Service 110a-c may transmit a response to the first request by the client 210, the first response comprising the context-specific identifier. For example, the Controller/Service may return the available memory for the requested node to the requesting client along with the global path of the node.

Figure 3:
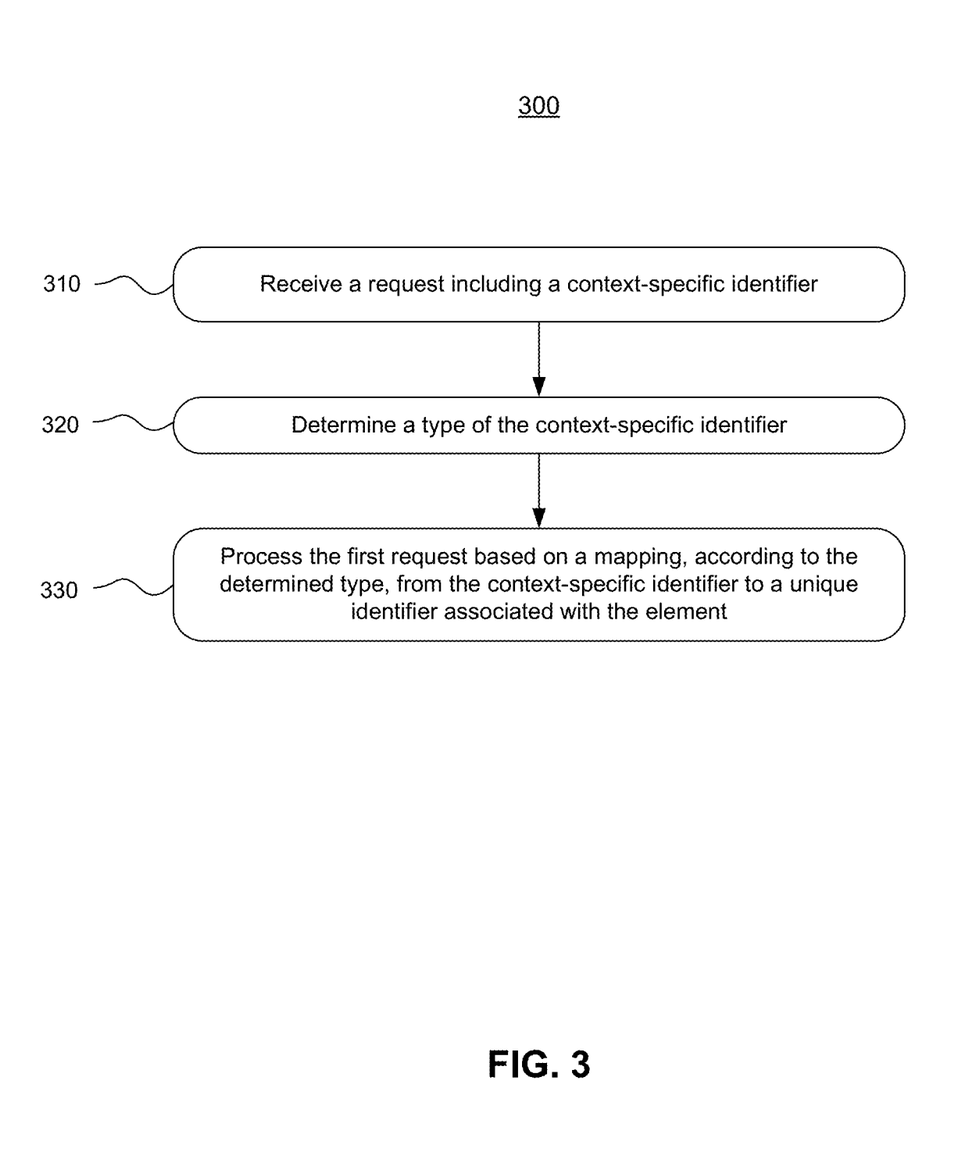
FIG. 3 illustrates an example method for the polymorphic identification of entities in a virtualization environment.

FIG. 3 illustrates an example method 300 for the polymorphic identification of entities in a virtualization environment. The method may begin at step 310, where the Controller/Service 110a-c receives a first request associated with one of the elements using an application programming interface (API), the first request including a context-specific identifier. At step 320, the Controller/Service 110a-c determines, using reflection, a type of the context-specific identifier. At step 330, the Controller/Service 110a-c processes the first request based on a mapping, according to the determined type, from the context-specific identifier to a unique identifier associated with the element. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for the polymorphic identification of entities in a virtualization environment including the particular steps of the method of FIG. 3, this disclosure contemplates any suitable method for the polymorphic identification of entities in a virtualization environment including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
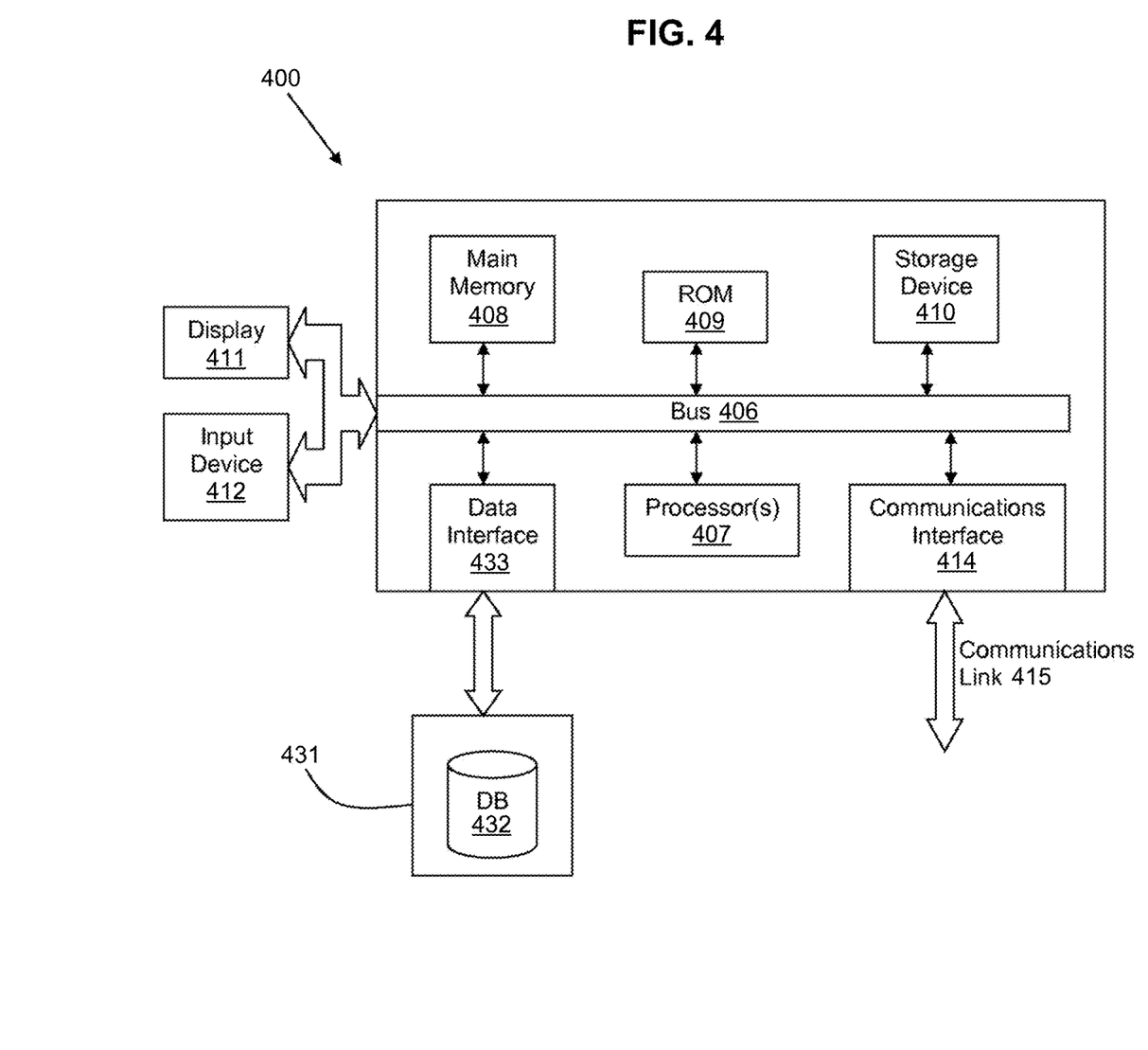
FIG. 4 illustrates a block diagram of a computing system suitable for implementing particular embodiments disclosed herein.

FIG. 4 is a block diagram of an illustrative computing system 400 suitable for implementing particular embodiments disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (MC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to particular embodiments, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware.

The term "computer readable medium" or "computer usable medium" as used herein refers to any medium that participates in providing instructions to processor 407 for execution. Such a medium may take many forms, including but not limited to, nonvolatile media and volatile media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions is performed by a single computer system 400. According to other embodiments, two or more computer systems 400 coupled by communication link 415 (e.g., LAN, PTSN, or wireless network) may perform the sequence of instructions in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. A database 432 in a storage medium 431 may be used to store data accessible by the system 400 by way of data interface 433.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
a server comprising a single application programming interface (API) and programmed instructions stored in a memory and executed by a processor of the server to receive a plurality of requests for information associated with one or more elements of a virtualization environment,
wherein each of the plurality of requests comprises an identifier that identifies an element of the one or more elements, the identifier in each request comprising a string having a string format of a plurality of different types of string formats that identify at least one of a location or name of the element identified in each request, the plurality of types being incompatible for interaction with the single API; and
wherein, upon receiving a first request of the plurality of requests from a client, the first request comprising a first identifier identifying a first element, a transformer of the server:
determines a type of string format of the first identifier;
identifies a conversion function from a plurality of conversion functions based on the determined type;
converts the first identifier to a unique identifier of the first element identified in the first request using the identified conversion function, wherein the unique identifier is compatible for interaction with the single API of the server; and
wherein the server retrieves information associated with the first element using the unique identifier to interact with the single API, and transmits a first response to the client to satisfy the first request, the first response comprising the retrieved information.

2. The system of claim 1, wherein the server receives a second request having a second identifier, wherein the second identifier comprises a second string in a second format that is different from the format of the string of the first identifier.

3. The system of claim 1, wherein the first identifier represents one of a plurality of entity-type nodes, wherein each of the plurality of entity-type nodes represents an element in a virtualization environment.

4. The system of claim 1, wherein the unique identifier is one of universal unique identifier, a media access control (MAC) address, a disk address, or other device identifier.

5. The system of claim 1, wherein the server:
performs code introspection to determine the type of the first identifier;
determines a function, based on the determined type; and
map, using the function, the first identifier to the unique identifier.

6. The system of claim 1, wherein the server transmits a second response to the client, wherein the second response is generated based on the first response.

7. The system of claim 1, wherein the server comprises an interceptor that receives the first request, determines the type of the first identifier, and converts the first identifier to the unique identifier.

8. A computer-readable non-transitory storage media comprising computer readable instructions that when executed by a processor cause the processor to:
receive, at a server comprising a single application programming interface (API), a plurality of requests for information associated with one or more elements of a virtualization environment,
wherein each of the plurality of requests comprises an identifier that identifies an element of the one or more elements, the identifier in each request comprising a string having a string format of a plurality of different types of string formats that identify at least one of a location or name of the element identified in each request, the plurality of types being incompatible for interaction with the single API; and
wherein, upon receiving a first request of the plurality of requests from a client, the first request comprising a first identifier identifying a first element, a transformer of the server:
determines a type of string format of the first identifier;
identifies a conversion function from a plurality of conversion functions based on the determined type;
converts the first identifier into a unique identifier of the first element identified in the first request using the identified conversion function, wherein the unique identifier is compatible for interaction with the single API of the server; and
wherein the server retrieves information associated with the first element using the unique identifier to interact with the single API, and transmits a first response to the client to satisfy the first request, the first response comprising the retrieved information.

9. The computer-readable non-transitory storage media of claim 8, wherein the server receives a second request having a second identifier, wherein the second identifier comprises a second string in a second format that is different from the format of the string of the first identifier.

10. The computer-readable non-transitory storage media of claim 8, wherein the first identifier represents one of a plurality of entity-type nodes, wherein each of the plurality of entity-type nodes represents an element in a virtualization environment.

11. The computer-readable non-transitory storage media of claim 8, wherein the unique identifier is one of a universal unique identifier, a media access control (MAC) address, a disk address, or other device identifier.

12. The computer-readable non-transitory storage media of claim 8, further comprising computer readable instructions that when executed by the processor cause the processor to:
    perform code introspection to determine the type of the first identifier;
    determine a function, based on the determined type; and
    map, using the function, the first identifier to the unique identifier.

13. The computer-readable non-transitory storage media of claim 8, further comprising computer readable instructions that when executed by the processor cause the processor to:
    transmit a second response to the client, wherein the second response is generated based on the first response.

14. A computer-implemented method for managing a virtualization environment, the method comprising:
    receiving, at a server comprising a single application programming interface (API), a plurality of requests for information associated with one or more elements of a virtualization environment,
    wherein each of the plurality of requests comprises an identifier that identifies an element of the one or more elements, the identifier in each request comprising a string having a string format of a plurality of different types of string formats that identify at least one of a location or name of the element identified in each request, the plurality of types being incompatible for interaction with the single API; and
    wherein, upon receiving a first request of the plurality of requests from a client, the first request comprising a first identifier identifying a first element, a transformer of the server:
        determines a type of string format of the first identifier;
        identifies a conversion function from a plurality of conversion functions based on the determined type;
        converts the first identifier into a unique identifier of the first element identified in the first request using the identified conversion function, wherein the unique identifier is compatible for interaction with the single API of the server; and
    wherein the server retrieves information associated with the first element using the unique identifier to interact with the single API, and transmits a first response to the client to satisfy the first request, the first response comprising the retrieved information.

15. The method of claim 14, wherein the server receives a second request having a second identifier, wherein the second identifier comprises a second string in a second format that is different from the format of the string of the first identifier.

16. The method of claim 14, wherein the first identifier a plurality of entity-type nodes, wherein each of the plurality of entity-type nodes represents an element in a virtualization environment.

17. The method of claim 14, wherein the unique identifier is one of a universal unique identifier, a media access control (MAC) address, a disk address, or other device identifier.

18. The method of claim 14, further comprising:
    performing, by the server, code introspection to determine the type of the identifier;
    determining, by the server, a function based on the determined type; and
    map, by the server, using the function the identifier to the unique identifier.

19. A system comprising:
    a server having a single application programming interface (API) and programmed instructions stored in a memory and executed by a processor of the server that receives a first request for information associated with one or more elements of a virtualization environment; and
    wherein the first request comprising a first identifier that identifies an element of the one or more elements, the identifier in each request comprising a string having a string format of a plurality of different types of string formats that identify at least one of a location or name of the element identified in each request, the plurality of types being incompatible for interaction with the single API, a transformer of the server:
        determines a type of string format of the first identifier;
        identifies a conversion function from a plurality of conversion functions based on the determined type;
        converts the first identifier to a unique identifier of the first element identified in the first request using the identified conversion function, wherein the unique identifier is compatible for interaction with the single API of the server; and
    wherein the server retrieves information associated with the first element using the unique identifier to interact with the single API, and transmits a first response to the client to satisfy the first request, the first response comprising the retrieved information; and
    wherein the server receives a second request having a second identifier, the second identifier comprising a second string in a second format that is different from the first format of the first string of the first identifier.

20. The system of claim 19, wherein the first identifier represents one of a plurality of entity-type nodes, wherein each of the plurality of entity-type nodes represents an element in a virtualization environment.

21. The system of claim 19, wherein the server:
    performs code introspection to determine the type of the first identifier;
    determines a function, based on the determined type; and
    map, using the function, the first identifier to the unique identifier.

22. A computer-readable non-transitory storage media comprising computer readable instructions that when executed by a processor cause the processor to:
    receive, at a server having a single application programming interface (API), a first request for information associated with one or more elements of a virtualization environment; and
    wherein the first request comprising a first identifier that identifies an element of the one or more elements, the identifier in each request comprising a string having a string format of a plurality of different types of string formats that identify at least one of a location or name of the element identified in each request, the plurality of types being incompatible for interaction with the single API, a transformer of the server:
        determines a type of string format of the first identifier;
        identifies a conversion function from a plurality of conversion functions based on the determined type;
        converts the first identifier into a unique identifier of the first element identified in the first request using the identified conversion function, wherein the unique identifier is compatible for interaction with the single API of the server; and wherein the server retrieves information associated with the first element using the unique identifier to interact with the single API, and transmits a first response to the client to satisfy the first request, the first response comprising the retrieved information;

wherein the server receives a second request having a second identifier, the second identifier comprising a second string in a second format that is different from the first format of the first string of the first identifier.

23. The computer-readable non-transitory storage media of claim 22, further comprising computer readable instructions that when executed by the processor cause the processor to:

perform code introspection to determine the type of the first identifier;

determine a function, based on the determined type; and map, using the function, the first identifier to the unique identifier.

24. The computer-readable non-transitory storage media of claim 22, further comprising computer readable instructions that when executed by the processor cause the processor to:

transmit a second response to the client, wherein the second response is generated based on the first response.

* * * * *